United States Patent [19]

Krane

[11] 4,379,316

[45] Apr. 5, 1983

[54] READ/WRITE HEAD CARRIAGE ASSEMBLY FOR A FLOPPY DISK DRIVE

[75] Inventor: Jan G. Krane, San Juan Capistrano, Calif.

[73] Assignee: Siemens Corporation, Iselin, N.J.

[21] Appl. No.: 272,493

[22] Filed: Jun. 11, 1981

[51] Int. Cl.³ .......................... G11B 5/54; G11B 5/48; G11B 21/20

[52] U.S. Cl. ..................................... 360/105; 360/104

[58] Field of Search ................... 360/105, 99, 103-104

[56] References Cited

U.S. PATENT DOCUMENTS

| | | |
|---|---|---|
| 3,946,439 | 3/1976 | Castrodale et al. . |
| 4,089,029 | 5/1978 | Castrodale et al. . |
| 4,146,912 | 3/1979 | Kukreja . |
| 4,151,573 | 4/1979 | Tandon et al. . |
| 4,247,877 | 1/1981 | Keller et al. . |
| 4,250,530 | 2/1981 | Yang ..................................... 360/105 |
| 4,263,630 | 4/1981 | Pierson ................................ 360/104 |
| 4,306,258 | 12/1981 | Higashiyama et al. ................ 360/99 |
| 4,309,732 | 1/1982 | Kronfeld et al. .................... 360/104 |
| 4,315,292 | 2/1982 | Kronfeld ............................. 360/104 |
| 4,328,521 | 5/1982 | Pexton et al. ........................ 360/99 |
| 4,343,025 | 8/1982 | Kronfeld et al. .................... 360/104 |

FOREIGN PATENT DOCUMENTS 2466832 4/1981 France .

OTHER PUBLICATIONS

PCT Application No. WO 81/01071.
PCT Application No. US80/01187.

Primary Examiner—Alfred H. Eddleman
Attorney, Agent, or Firm—Karl F. Milde, Jr.

[57] ABSTRACT

There is disclosured a read/write head carriage assembly for a data storage device such as a floppy disk drive. The carriage assembly includes a base which is movable, relatively, in a linear direction parallel to the plane of the recording medium. A head support arm is pivoted at one end with respect to the base. First and second magnetic transducers are mounted in opposed relationship on the base and on the free end of the support arm, respectively. The two transducers are gimbal-mounted to permit self alignment to the recording medium.

10 Claims, 11 Drawing Figures

READ/WRITE HEAD CARRIAGE ASSEMBLY FOR A FLOPPY DISK DRIVE

BACKGROUND OF THE INVENTION

The present invention is directed to magnetic storage devices and, in particular, to a magnetic read/write head carriage assembly for data storage devices using a flexible, double-sided magnetic recording medium.

Early magnetic storage devices for data processing systems made use of contact recording. This recording method was superceded to some extent after development of a magnetic head loading assembly in which the head was spaced away from the magnetic surface even during recording operations. This latter arrangement, which is currently used in high speed magnetic "hard disk" storage systems, permits the magnetic head to "fly" on a thin air layer over the recording medium so as to permit intimate interaction between the transducer and the magnetic surface. Contact recording has been used continuously, on the other hand, for less expensive, low speed magnetic storage devices such as magnetic tape and, more recently, floppy disk recording systems.

As is well known, a floppy disk is a rotatable, flexible magnetic disk, normally arranged in a cardboard dust cover. The so-called "floppy disk drive"—namely, a device for reading and recording information on such floppy disks—have come into widespread use for program and data storage because of their relatively low cost and small size notwithstanding a relatively rapid access to recorded information.

In the original floppy disk systems, the transducer structure generally comprised a single magnetic read/write head having a contact surface formed as a segment of a spheroid, or at least in a curved shape. The transducer was mounted on a movable carriage or base so that it could be accessed to different circumferential tracks on a floppy disk. On the opposite side of the disk, and also in contact with the disk was a pressure pad mounted on one end of a spring loaded arm. This arm, which was pivoted at its other end to the carriage base, was controlled by a solenoid to move into and out of contact with the floppy disk to permit data transfer operations to take place. The purpose of the pressure pad was to exert a tracking force through the floppy disk against the single transducer.

Recently, however, floppy disk drives have been developed for floppy disks on which both sides are used for data storage and transfer operations: the so-called "double-sided" floppy disks. With these drives, a single low speed accessing mechanism continues to be employed but the storage capacity of the device is twice the capacity of a floppy disk drive using single-sided floppy disks. With these improved drives, the magnetic heads are arranged on opposite sides of the floppy disk in a generally opposed relationship, with only a slight offset in the two head gaps to avoid flux interaction.

As mentioned above, floppy disk drives have found widespread use in a variety of applications due to their low cost. Therefore, it has been the main objective in the design of these devices more than with other types of data storage devices, to achieve simple structures of high reliability.

Present floppy disk drive manufacturers are using two approaches in the design of read/write magnetic head carriage assemblies for contact recording operations on double-sided floppy disks. One of these approaches is known from the U.S. Pat. Nos. 3,946,439 and 4,089,029, both to Castrodale et al. With this type of magnetic recording device in which a pair of transducers contact opposite faces of the recording medium, each of the transducers is mounted on a relatively weak gimbal spring. Relatively rigid load arms bear on dimples located on the center of the transducers to form universal joint connections with the transducers. The load arms are mounted on relatively stiff gimbal spring portions and are independently biased toward each other to apply a predetermined force to the transducers. This known structure allows the transducers to pitch and throw with wobbling movements of the floppy disk and permits the arms to move together to find the location for the transducers which permits the floppy disk to remain planar. This arrangement is an effective solution in respect to accessing times and storage capacity; however, it is expensive and sensitive to adjustment.

Another magnetic recording device for double-sided floppy disks is described in U.S. Pat. No. 4,151,573 to Tandon et al. This device uses a fixed transducer on one side of the floppy disk and a movable transducer on the opposite side. The movable transducer is gimballed on a pivoted, spring loaded arm of low mass and high stiffness and urges the floppy disk against the fixed transducer with a light force. The force is adequate to correct the deflections of the recording surface in a direction normal thereto, although this arrangement requires a slight penetration of the fixed transducer into the plane of the floppy disk. The read/write head assembly described in this patent is extremely reliable and less expensive than the arrangement taught by Castrodale et al.; however, it exhibits a lower data transfer rate than the aforementioned arrangement for reasons which are not completely understood.

SUMMARY OF THE INVENTION

A principle object of the present invention is to provide a read/write head carriage assembly for use with flexible, double-sided magnetic recording media which is less expensive to manufacture and less sensitive to adjustment than the above-noted recording device of Castrodale et al.

It is another object of the present invention to provide a read/write head carriage assembly of the type previously described which is capable of reading and recording on flexible, double-sided magnetic recording media with a bit density comparable to that achieved with the recording device of Castrodale et al.

These objects, as well as other objects which will become apparent from the discussion that follows, are achieved, according to the present invention, by providing a head carriage assembly which comprises a carriage base having a first gimbal-mounted transducer at a first location and a head support arm having one end pivoted with respect to the base and a second gimbal-mounted transducer on its other end. The two transducers are disposed in adjacent relationship for contact recording on opposite sides of the recording medium. The support arm is mechanically biased toward the carriage base so that the second transducer exerts a tracking force through the recording medium against the first transducer. The carriage base is mounted in the data storage device in such a position that when the recording medium, which is itself substantially planar, is placed between the two transducers and the second transducer is mechanically biased toward the first so as to exert a tracking force, the recording medium remains relatively planar in the area where it passes between the two transducers.

Finally, load point elements are provided on the carriage base and on the support arm to engage, respectively, the central regions of the two transducers, thereby to provide fixed "load points" in directions normal to the plane of the recording medium. These load point elements thus relieve the gimbals, upon which the two transducers are mounted, from having to transmit the tracking force exerted by the transducers.

According to a preferred feature of the present invention, both of the transducers are shaped so as to have a substantially planar surface for recording contact with the recording medium. When the two transducers are in operation, the planar surfaces clamp the recording medium between them, thereby eliminating ripples or other irregularities so that intimate contact is made between the respective heads and the recording medium.

Preferably, the transducers thus retained by gimbals and load point elements have two degrees of freedom about two perpendicular axes, respectively, which are parallel to the plane of the recording medium. One of these axes extends in the direction of travel of the recording medium whereas the other extends in the direction of relative motion between the carriage base and the recording medium.

According to another preferred feature of the invention, the head carriage assembly is also provided with an auxiliary load arm which is pivoted with respect to the carriage base. The auxiliary load arm is movable in a direction normal to the plane of the recording medium between two load positions. In a first load position a load spring urges the auxiliary load arm toward the head support arm to exert an additional biasing force thereto. In the second load position, the auxiliary load arm is lifted away from the head support arm thereby reducing the force on the head support arm. Thus, the head support arm remains almost stationary in both load positions but is urged against the surface of the recording medium with different forces: a first, larger force for read/write operations and a second, reduced force for idling.

For a full understanding of the present invention, reference should now be made to the following detailed description of the preferred embodiments of the invention and to the accompanying drawings.

DESCRIPTION OF THE PREFERRED EMBODIMENTS

Figure 1:
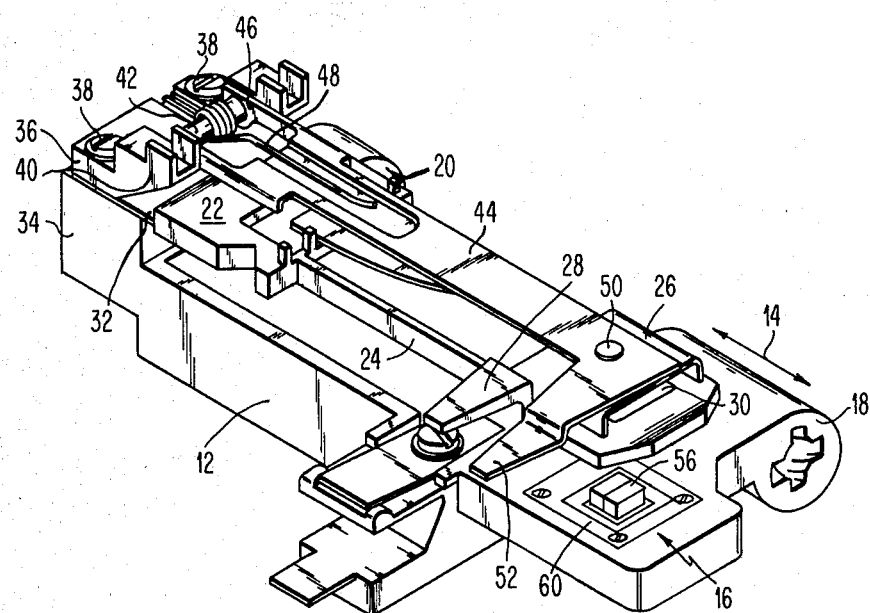
FIG. 1 is a perspective view of a read/write head carriage assembly for a floppy disk drive including a carriage base, a main support arm and an auxiliary support arm in accordance with a preferred embodiment of the present invention.

The preferred embodiments of the present invention will now be described in connection with FIGS. 1–11 of the drawings. Identical elements in the various figures are designated with the same reference numerals.

In as much as floppy disk storage devices are widely used, only such parts are disclosed which directly belong to a read/write head carriage assembly for the reason of brevity and simplicity. Reference may be made to the aforementioned patents, and to the U.S. Pat. No. 4,146,912 for details of such features as the accessing mechanism and means for holding, clamping and rotating the flexible, double-sided magnetic recording medium; that is, the "floppy disk".

Reference is also made to the commonly owned U.S. Pat. No. 4,247,877 which describes a particular carriage assembly comprising a carriage base, a head support arm pivoted with respect to the base and an auxiliary load arm, also pivoted with respect to the base. It is this configuration which is utilized in the preferred embodiment of the present invention.

FIG. 1 shows a carriage assembly of the type disclosed in the aforementioned U.S. Pat. No. 4,247,877. This assembly includes a carriage base 12 adapted to be mounted in a floppy disk drive and moved in a linear direction, indicated by the arrows 14, parallel to the plane of the floppy disk. It will be understood that in order drives the carriage base may be held stationary and the floppy disk translated with respect thereto, it being relative motion between the carriage base and the floppy disk which is required for accessing different tracks on the floppy disk. The base 12 has a magnetic transducer mounting location indicated generally at 16 which supports a lower transducer in operative relationship with a floppy disk. When mounted in floppy disk drives, the base 12 is engaged by a lead screw (not shown) that passes through receptor portions 18 and 20 and, when rotated, increments the base in the linear direction indicated by the arrows 14 to move the transducers from track to track. A suitable arrangement for shifting the read/write head carriage assembly is disclosed in the commonly owned U.S. patent application Ser. No. 111,226 filed Jan. 11, 1980, now U.S. Pat. No. 4,315,290, for "Apparatus for Shifting the Magnetic Read/Write Head Carriage in a Floppy Disk Drive Unit".

At the end of the carriage base 12, spaced apart from the transducer mounting location 16, is pivotally mounted a low mass, relatively stiff main head support arm 22. This head support arm 22 has a thinned center section 24 along its length which serves to reduce weight without reducing rigidity. A metal housing 26, forming a head shield for an upper magnetic transducer, is provided adjacent the free end of the head support arm 22. Also adjacent to the free end of the head support arm is a landing control tab 28. This control tab is engagable by a control element, such as a solenoid, in the floppy disk drive to permit automatic pivoting of the head support arm 22 toward and away from the lower transducer mounting location 16. A small aperture 30 in the support arm 22 facing the lower transducer mounting location is provided for mounting the upper transducer in a manner to be described below.

The other end of the head support arm 22 is coupled to the carriage base 12 by a pivot hinge spring 32. The hinge spring 32 engages a head load stop 34 to define the limit for movement in the direction toward the lower transducer location 16.

The hinge spring 32 is sandwiched between the head load stop 34 and a bearing block 36. This bearing block is attached to the upstanding end of the carriage base 12 by screws 38. On the other side, spaced apart from the screws, the bearing block 36 is provided with a sloping surface to permit movement of the hinge spring 32 when the head support arm 22 is lifted into its unloaded position. On this side, the bearing block 36 is also provided with a socket 40 forming bearings for a pin 42.

The pin 42 serves as a pivot for an auxiliary load arm 44 extending essentially in parallel with the head support arm 22. The auxiliary load arm 44 is a flat, low mass cantilever. Adjacent to its mounted end, the arm 44 is provided with a pair of elongated side arms 46 bent at right angles for mounting the auxiliary load arm on the pin 42.

The pin 42 forms a bearing for a torsional load spring 48, the short end of this spring 48 resting against the bearing block 36. The other, elongated linear end of this spring runs longitudinally along a trough-shaped central portion of the auxiliary load arm 44.

The free end of the auxiliary load arm 44 is provided with a knob 50 facing the head shield 26 and forming a head load fulcrum. In addition, the auxiliary load arm 44 is provided with a lift tab 52 located adjacent to the control tab 28 of the head support arm 22. This lift tab 52 is actuated in the floppy disk drive by a second control element (not shown), such as a solenoid, to permit automatic pivoting of the auxiliary load arm 44 toward and away from the head support arm 22.

Figure 2:
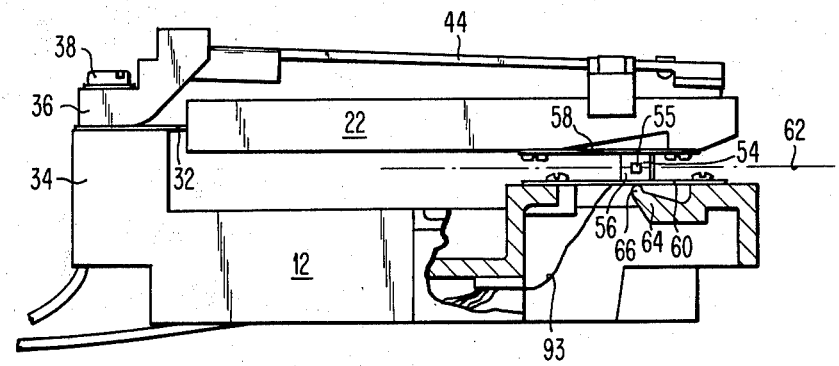
FIG. 2 is a side view of the head carriage assembly of FIG. 1.

Having described the preferred embodiment of the environment of the present invention, attention is now directed to the nature of the upper and lower magnetic transducers and the manner in which they are mounted. FIG. 2 illustrates one preferred embodiment which the upper transducer 54 as well as the lower transducer 56 are mounted on gimbal springs 58 and 60, respectively. Of these two transducers, only the lower transducer 56 and its corresponding gimbal spring 60 are seen in FIG. 1. However, both transducers and gimbals are shown in side view in FIG. 2.

As is seen in FIG. 2, the gimbal springs 58 and 60 are attached, respectively, to the head support arm 22 and the carriage base 12 by means of screws. The transducers 54 and 56 are mounted on these gimbal springs by means of a suitable cement. The transducers 54 and 56 may be small rectangular slider heads of the type well known in the art which comprises an abrasion resistant barium titanate pad having an embedded ferrite read/write head and adjacent trim erase heads. The magnetic core elements and energizing windings may extend through the respective gimbal springs in a manner described more particularly hereinbelow. As indicated in FIG. 2, a central groove 55 is provided on the underside of each transducer, parallel to the direction of relative motion between the floppy disk and the transducer, to permit air passage therebetween and to reduce air bearing effects at the speeds of revolution involved for the floppy disk (normally 360 RPM).

The position of the floppy disk relative to the two transducers 54 and 56 is indicated in FIG. 2 by the dashed lines 62. As will be noted, the floppy disk remains completely planar while sandwiched between the transducers.

Preferably, the position of at least the lower transducer 56 in a position normal to the floppy disk is fixed by a load point element 64 which terminates in a load point 66 facing toward the transducer.

Figure 3:
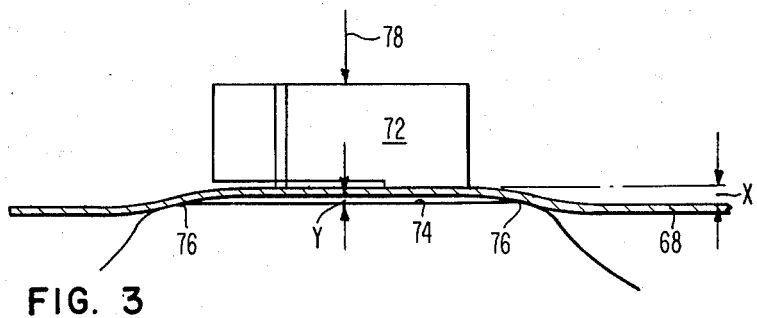
FIG. 3 is a side, fragmentary view of a transducer system for a floppy disk drive according to the prior art.

FIG. 3 illustrates the head configuration disclosed in the aforementioned U.S. Pat. No. 4,151,573. As is described there, the lower head is rigidly mounted on the carriage base and is, therefore, referred to as a "fixed transducer". Whereas various types of transducers may be utilized in this position, they typically have a convex surface facing the floppy disk 68 (which is shown in FIG. 3 in a cross-section taken through the center of the lower and upper transducers). The fixed transducer 70 is positioned to penetrate or intercept the nominal plane of the disk 68, thereby displacing the disk from this plane by a distance "X" which is normally in the range of 0.008 to 0.010 inches. The apex of this transducer is a flat portion 74 of approximately 0.2 inches diameter. Preferably, the transducer surface is first shaped flat, and a spheroidal convex rim 76 is then formed to blend or smooth the intersection between the flat and curved surfaces so as to minimize wear. The rim 76 normally has a two inch radius of curvature.

Due to the high relative speed of translation of the floppy disk 68 with respect to the lower and upper transducers 70 and 72, it is believed that the floppy disk moves away from the flat surface 74 of the lower transducer, leaving a small gap represented in FIG. 3 by the distance "Y". The width Y of this gap does not remain constant but is dependent upon the linear speed of the floppy disk with respect to the transducers (which is different for different tracks on the disk) and dependent upon the roughness of surface, and the flexibility and other properties of the disk. Thus, while it is desired that the floppy disk maintain intimate contact with the surface 74 of the transducer 70, it is possible to eliminate this gap only by increasing the tracking force exerted by the upper transducer 72 in the direction of the arrow 78. An increased tracking force increases the wear on the floppy disk as well as on the contact surfaces of the two transducers 70 and 72.

Accordingly, depending upon the width Y of the gap between the floppy disk 68 and the surface 74 of the lower transducer 70, the floppy disk drive employing the transducer configuration shown in FIG. 3 will have an unnecessarily low maximum bit rate; that is, the rate at which binary encoded data can be written onto and read from the floppy disk 68. The transducer configuration according to the present invention avoids this difficulty by arranging the contact surfaces of the upper and lower transducers exactly along the plane of the floppy disk as shown in FIG. 2.

Figure 9:
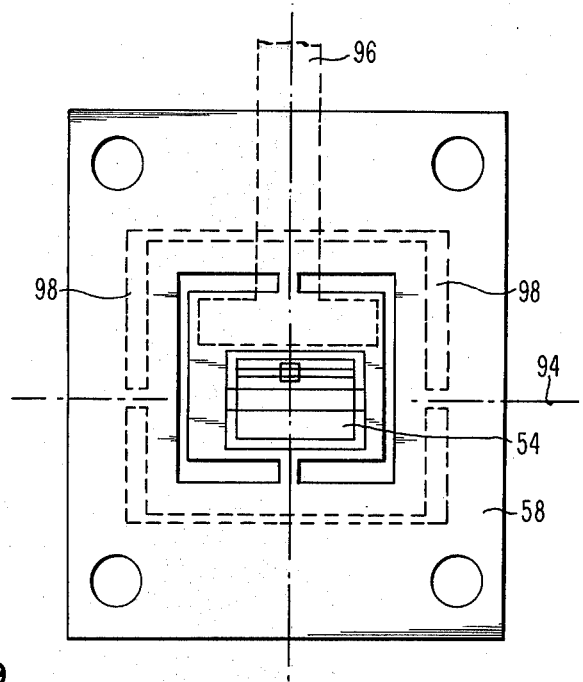
FIG. 9 is a bottom view of a gimbal-mounted upper transducer.
Figure 10:
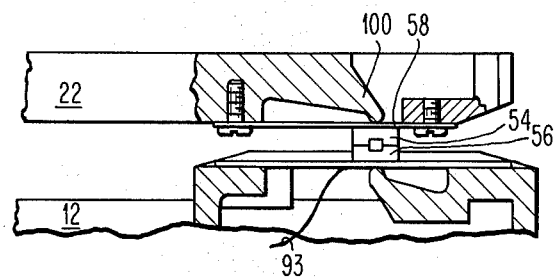
FIG. 10 is a fragmentary view of an alternative embodiment showing a portion of the carriage base and head support arm, partly in cross-section.
Figure 11:
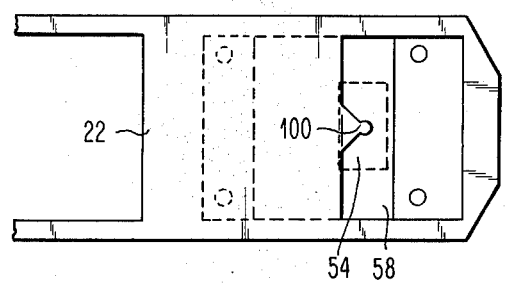
FIG. 11 is a top view of the head support arm of FIG. 10.

FIGS. 4–8 show details of the carriage base 12, particularly with respect to the mounting location for the lower transducer. FIGS. 9–11 show details of the transducer mounting location on the head support arm 22.

Figure 4:
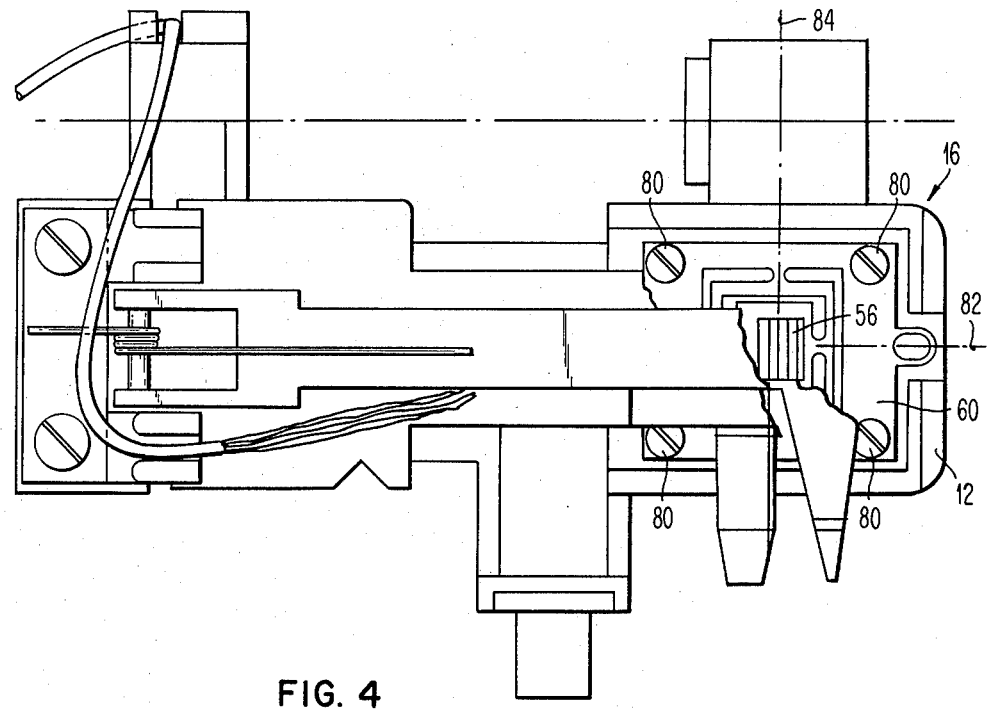
FIG. 4 is a top view of the head carriage assembly of FIG. 1.

FIG. 4 illustrates the read/write head carriage assembly in top view with the head support arm and auxiliary arm cut away to reveal the transducer mounting location on the carriage base. As may be seen, the lower transducer 56 is mounted on the gimbal 60 which, in turn, is attached to the carriage base 12 by four screws 80. The gimbal 60 provides two degrees of freedom for the transducer 56 about perpendicular axes 82 and 84, respectively, which are substantially parallel to the plane of the floppy disk.

Figure 5:
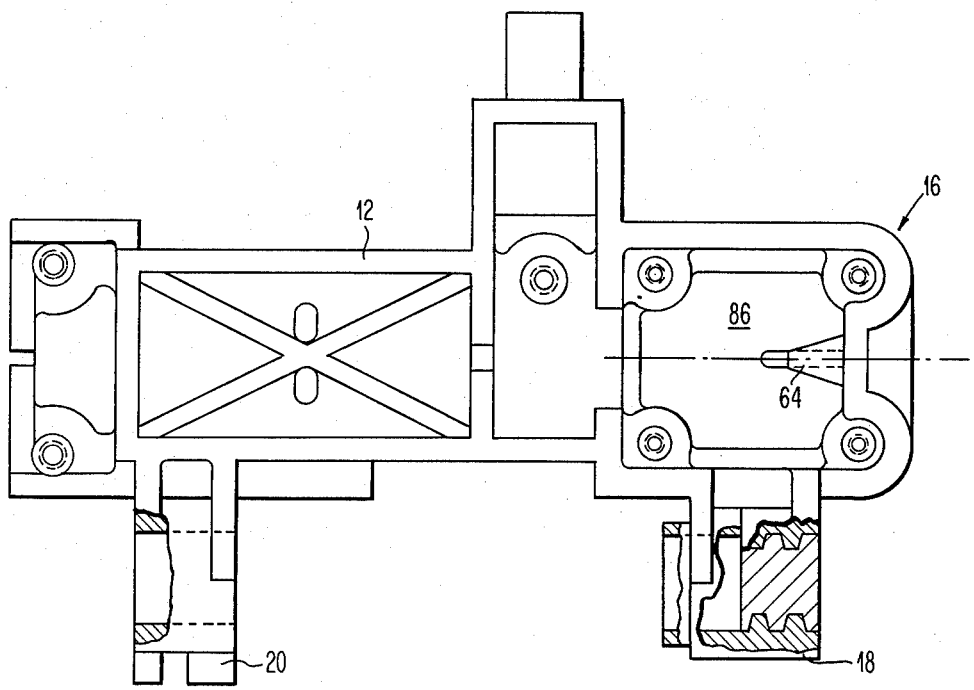
FIG. 5 is a bottom view of the head carriage assembly of FIG. 1.

FIG. 5 shows the bottom of the carriage base 12. As may be seen, the transducer mounting location 16 includes a substantially rectangular open area 86 for mounting the gimbal 60. The load point element 64 extends into the open area from the end of the base.

Figure 6:
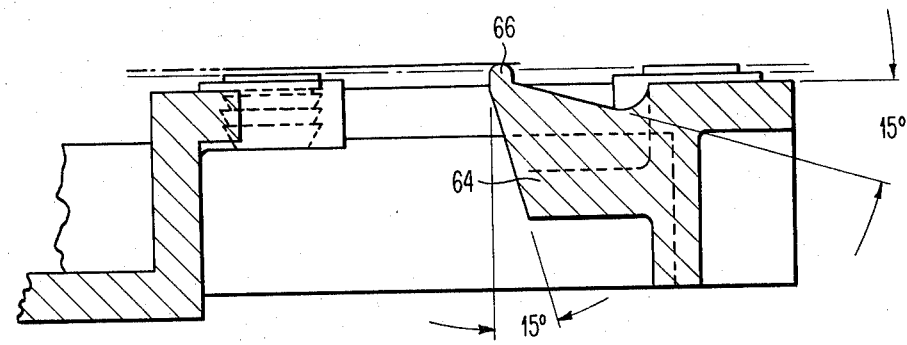
FIG. 6 is a fragmentary view of the carriage base employed in the head carriage assembly of FIG. 1.

Details of the load point element 64 are shown in FIG. 6. The tip or rounded end 66 of the load point element 64 is positioned to contact the gimbal 60 beneath the lower transducer 56 to provide a load point therefor that is fixed, relative to the base, in a direction normal to the plane of the floppy disk. As noted above, the carriage base, and thus the load point element, are arranged in such a way that the floppy disk remains substantially planar in the area where it passes between the lower and upper transducers.

The sides of the load point element 64 extending outward from the tip are tapered at a 15° angle with respect to the horizontal and vertical axes of the base. This tapered configuration minimizes the "proximity effect" of the load point element while ensuring its sufficient strength to serve its intended function.

Figure 7:
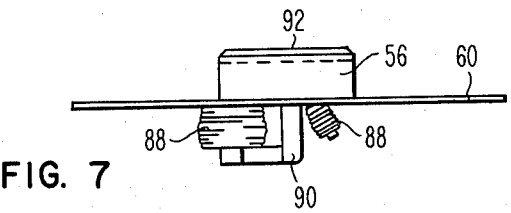
FIG. 7 is a side view of a gimbal-mounted lower transducer.
Figure 8:
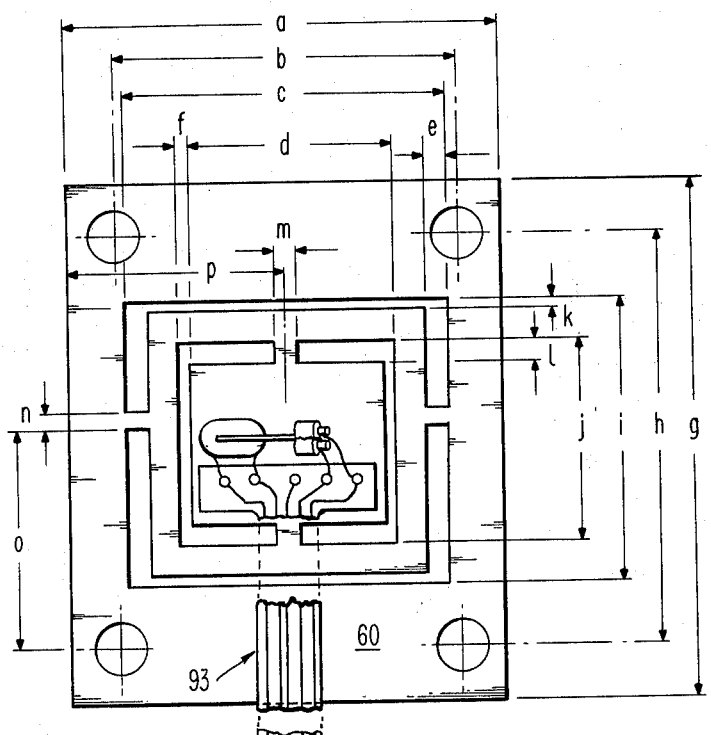
FIG. 8 is a bottom view of a gimbal-mounted lower transducer.

FIGS. 7 and 8 show the gimbal-mounted lower transducer 56 in side and bottom view, respectively. The transducer coils 88 and transducer core 90 are arranged on the side of the gimbal 60 opposite to the barium titanate pad. As is shown in FIG. 7, the transducer 56 has a planar surface 92 for contacting the floppy disk.

The gimbal 60 is etched from sheet metal which may be Berylco No. 25 or its equivalent. The thickness of the metal is preferably 0.0040 inches. The internal and external dimensions are preferably as indicated in the following table:

TABLE 1

| a - .722 | i - .470 |
|---|---|
| b - .562 | j - .340 |
| c - .540 | k - .015 |
| d - .345 | l - .040 |
| e - .040 | m - .028 |
| f - .015 | n - .028 |
| g - .860 | o - .366 |
| h - .680 | p - .361 |

Attached to the back of the gimbal 60 is a thin strip of insulating material 93 on which are printed five conductor leads for communicating electrically with the transducer coils.

FIG. 9 shows the gimbal 58 arranged to support the upper magnetic transducer 54 on the support arm 22. This gimbal 58 may have dimensions which are identical to the gimbal 60 for the lower head 56. This gimbal provides two degress of freedom for the transducer 54 about two perpendicular axes 94 and 96 which are arranged substantially parallel to the plane of the floppy disk. Alternatively, the cut-out portion 98 may be omitted so that the gimbal provides a degree of freedom only about the axis 96 that is transverse to the direction of travel of the floppy disk beneath the transducer 54.

FIGS. 10 and 11 illustrate an alternative embodiment of the invention to that shown in FIG. 2, wherein a second load point element 100 engages the gimbal 58 in the central region behind the upper transducer 54 to define the limit for movement in the direction away from the lower transducer 56 and normal to the floppy disk. This load point element, which may be identical in shape and dimensions to the load point element 64 for the lower transducer, prevents the tracking force exerted by the support arm 22 from causing damage to the upper gimbal 58.

There has thus been shown and described a novel read/write head carriage assembly which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A read/write head carriage assembly for a data storage device for use with a flexible, double-sided magnetic recording medium, said carriage assembly comprising, in combination:
    (a) a carriage base mounted in said data storage device for relative motion in a substantially linear direction parallel to the plane of said recording medium, said base having a first transducer mounting location;
    (b) a support arm having two ends, one end being pivoted with respect to said base and the other end having a second transducer mounting location movable with said support arm toward and away from said first transducer location;
    (c) a first gimbal mounted on said base at said first transducer mounting location;
    (d) a first magnetic transducer mounted on said first gimbal so as to be in operative relationship with one side of said recording medium, said first transducer having two degrees of freedom about two perpendicular first axes substantially parallel to the plane of said recording medium;
    (e) a first load point means, coupled to said base, engaging a central region of said first transducer to provide a load point that is fixed relative to said base in a direction normal to the plane of said recording medium;
    (f) a second gimbal mounted on said support arm at said second transducer mounting location;
    (g) a second magnetic transducer mounted on said second gimbal so as to be in operative relationship with the opposite side of said recording medium, said second transducer having two degrees of freedom about two perpendicular second axes substantially parallel to the plane of said recording medium;
    (h) spring means for mechanically biasing said support arm toward said base, thereby causing said second transducer to exert a tracking force through said recording medium against said first transducer, said base being mounted in said data storage device such that said recording medium remains substantially planar in the area where it passes between said first and second transducers.

2. The head carriage assembly recited in claim 1, wherein said first transducer has a substantially planar contact surface facing said second transducer.

3. The head carriage assembly as recited in claim 1, wherein said second transducer has a substantially planar contact surface facing said first transducer.

4. The head carriage assembly recited in claim 1, wherein said first and second transducers each have a substantially planar contact surface facing the other transducer.

5. The head carriage assembly recited in claim 1, wherein said first axes are transverse and parallel, respectively, to the direction of travel of said recording medium past said transducers.

6. The head carriage assembly recited in claim 1, wherein said second axes are transverse and parallel, respectively, to the direction of travel of said recording medium past said transducers.

7. The head carriage assembly recited in any one of the claims 1–5 and 6, further comprising a second load point means, coupled to said support arm, engaging a central region of said first transducer to provide a load point that is fixed relative to said support arm in a direction normal to the plane of said recording medium.

8. The head carriage assembly recited in any one of the claims 1–5 and 6, further comprising an auxiliary load arm pivoted with respect to said base and movable in a direction normal to the plane of the recording medium toward and away from said support arm between a first load position in which said first and second transducers, contacting the surfaces of said recording medium are in an operative relationship with said medium for performing read/write operations and a second load position in which said transducers still in contact with said medium, are idling along tracks of said medium in a nonoperative relationship, said auxiliary arm being movable from the first load position into the second load position.

9. The head carriage assembly recited in claim 1, wherein said first gimbal comprises a first sheet of material having first and second interrupted, circuitous openings cut therein, said first opening being arranged within the area surrounded by said second opening thereby forming a first, central island on said sheet of material and a first, intermediate island between said first central island and the outer periphery of said first sheet of material, said first opening having first and second webs, extending outward along one of said first axes between said first central and said first intermediate islands, and interrupting the circuitous path of said first opening, said second opening having third and fourth webs, extending outward along the other one of said first axes between said first intermediate island and said outer periphery of said first sheet of material, and interrupting the circuitous path of said second opening.

10. The head carriage assembly recited in either one of claims 1 or 9, wherein said second gimbal comprises a second sheet of material having third and fourth interrupted, circuitous openings cut therein, said third opening being arranged within the area surrounded by said fourth opening thereby forming a second, central island on said sheet of material and a second, intermediate island between said second central island and the outer periphery of said second sheet of material, said third opening having fifth and sixth webs, extending outward along one of said second axes between said second central and said second intermediate islands, and interrupting the circuitous path of said third opening, said fourth opening having seventh and eighth webs, extending outward along the other one of said second axes between said second intermediate island and said outer periphery of said second sheet of material, and interrupting the circuitous path of said fourth opening.

* * * * *